United States Patent [19]

Okuda

[11] 3,980,263
[45] Sept. 14, 1976

[54] DEVICE FOR HOLDING AN ELONGATED OBJECT SUCH AS A WIRE

[75] Inventor: Seizi Okuda, Yokohama, Japan

[73] Assignee: Nifco Inc., Tokyo, Japan

[22] Filed: June 5, 1975

[21] Appl. No.: 584,235

[30] Foreign Application Priority Data
June 8, 1974   Japan.............................. 49-65876

[52] U.S. Cl. ............................. 248/73; 24/73 AP; 248/74 PB
[51] Int. Cl.² ........................................... F16L 3/00
[58] Field of Search.......... 248/73, 71, 74 R, 74 PB; 24/73 SA, 73 AP, 73 PB, 255 C, 255 SL, 257 R, 243 H, 243 AC, 248 SL, 249 LL, 249 SL; 52/677, 684; 174/40 CC, 164

[56] References Cited
UNITED STATES PATENTS

| | | | |
|---|---|---|---|
| 2,974,703 | 3/1961 | Rapata................................... | 248/73 |
| 3,088,702 | 5/1963 | Orenick et al......................... | 248/71 |
| 3,090,826 | 5/1963 | Cochran...................... | 248/74 PB X |
| 3,126,184 | 3/1964 | Kropp................................... | 248/73 |
| 3,163,712 | 12/1964 | Cochran............................ | 248/71 X |
| 3,345,706 | 10/1967 | Stokes.............................. | 24/73 AP |
| 3,405,429 | 10/1968 | Vazquez........................... | 24/255 SL |
| 3,423,055 | 1/1969 | Fisher................................... | 248/73 |
| 3,529,795 | 9/1970 | Van Niel.............................. | 248/71 |

FOREIGN PATENTS OR APPLICATIONS

| | | | |
|---|---|---|---|
| 264,090 | 8/1968 | Austria................................. | 52/684 |
| 921,029 | 3/1963 | United Kingdom................... | 248/73 |

Primary Examiner—Roy D. Frazier
Assistant Examiner—Rodney H. Bonck
Attorney, Agent, or Firm—J. R. Halvorsen; R. W. Beart

[57] ABSTRACT

Disclosed is a plastic holder device which is useful in holding a length of wire and other elongated objects. The holder has a pair of opposite legs extending from the head portion. One leg has a slant branch extending from the vicinity of the root of the leg, and it has a flap hinged to its free end.

The flap has a similar branch, and when the flap is raised around the hinge, and is fitted in the inter-leg space, the branch of the flap defines with the counter branch of the leg, a converging space in which an elongated object is fixedly confined. The holder device is easy to handle, still assuring the positive gripping of the elongated object.

3 Claims, 4 Drawing Figures

1

DEVICE FOR HOLDING AN ELONGATED OBJECT SUCH AS A WIRE

BACKGROUND OF THE INVENTION

This invention relates to a plastic device for holding a length of wire and other elongated objects, and particularly to such a holder device which is useful in holding length of conductors extending on a distributing board of an electric machine or apparatus or on a board positioned in the engine chamber of an automobile.

A variety of holders of the type mentioned above have been hitherto proposed and actually used. One object of this invention is to provide such a plastic holder device which is easy to handle, compared with the conventional devices, still assuring the positive and reliable gripping of elongated objects. Another object is to provide such a plastic holders device which is advantageous to mass-production at a possible minimum cost.

SUMMARY OF THE INVENTION

To attain these and other objects a plastic holder device according to this invention comprises: an umbrella-shaped head, a pair of opposite plate legs integrally connected to and extending from the undersurface of the head portion; and a flap hinged to the end of one of the opposite legs, said flap having a nail catch at the free end thereof whereas the other leg having a hook at the free end thereof, thus connecting the opposite legs at their free ends by fitting the flap in the inter-leg space and by engaging the nail catch of the flap with the hook of the other leg; said one leg having a slant branch extending downward from the vicinity of the root of the one leg whereas said flap having a similar slant branch extending from the vicinity of the hinge portion so that the slant branch when the flap is brought to the closing position, may provide with the other slant branch a converging space in which the elongated object is fixedly confined.

BRIEF DESCRIPTION OF DRAWINGS

The above and other objects and advantages of this invention will be better understood from the following description which is to be made with reference to the accompanying drawings.

DETAILED DESCRIPTION OF THE INVENTION

Figure 1:
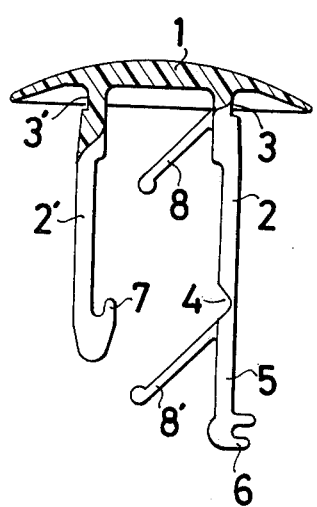
FIG. 1 is a front view of a plastic holder according to this invention, partly in section.

Referring to the drawings, 1 is an umbrella-shaped head portion and 2 and 2' are resilient plate legs both extending from the concave undersurface of the head portion in the parallel relationship with each other. Each leg has a recess portion 3 or 3' in the vicinity of the root of the leg to the concave undersurface of the head portion. The recess portion of the leg is adapted to receive and catch the circumference thickness of an aperture *a* of an extensive board A to which the holder device is to be attached. One leg 2 has a flap plate 5 hinged at 4 to the free end of one leg 2. This flap is somewhat longer than the space between the parallel legs 2 and 2', and the end of the flap has a nail catch 6. The end of the other leg 2' has a hook 7 on the inside thereof If the flap is raised and pushed in the inter-leg space, and if the nail catch 6 is caught by the hook 7, both legs will be integrally connected to each other.

The one leg 2 has a resilient and downward-slant branch 8 integrally connected to the inside of the leg in the vicinity of the root of the leg to the head portion whereas the flap 5 has a similar slant branch 8' in the vicinity of the hinge 4.

Figure 2:
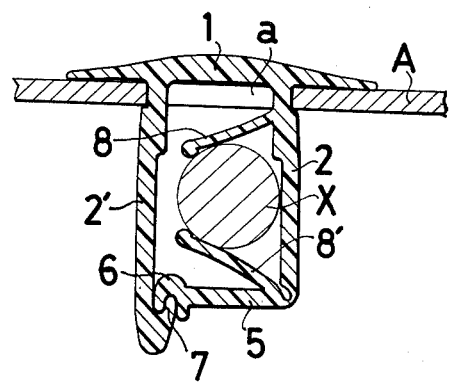
FIG. 2 shows, in section, the manner in which the holder device is used.
Figure 3:
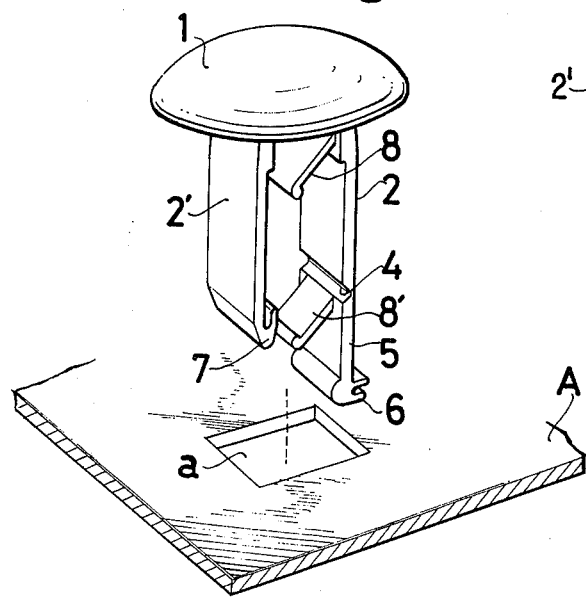
FIG. 3 is a perspective view of the holder device.

As shown in FIG. 1, these downward-slant branches extend in the same direction when the flap 5 is in the free and suspending position. However, when the flap of the one leg is raised and pushed in the inter-leg space, and when the nail catch of the flap is caught by the hook of the other leg, the slant branch of the flap will be put in the opposing position to the slant branch of the one leg, thus putting both slant branches in the converging position as best shown in FIG. 2.

In use, the parallel legs 2 and 2' of the holder device are inserted in an aperture *a* (which is shown as being square in this particular embodiment) of a board A until the head portion 1 is brought in contact with the uppersurface of the board. The legs are pinched by fingers, and are yieldingly deformed so as to cause the recesses at the roots of the legs to widen, thus making it easy for the circumference thickness of the aperture of the board to invade the recess spaces of the legs. Thus, the holder device is fixed to the board. A length of wire or other elongated object X is inserted in the space between the legs, and then the flap is raised and pushed in the inter-leg space until the nail catch of the flap is caught by the hook.

When the flap is raised, the associated slant branch is accordingly raised to push the elongated object X against the counter slant branch of the one leg, and when the flap is fitted in the inter-leg space and is caught, the object is positively held by the opposite and converging slant branches under the resilient influence.

The branch of the flap applies continuously a pushing force to the flap as a counter action to the object X, thus positively preventing the nail catch of the flap from undesirably being off from the hook for instance as a consequence of the movement of the object in the holder device.

As mentioned earlier, the flap is somewhat longer than the space between the opposite legs. Therefore, the flap when put in the closing position, will continuously apply to the opposite legs a force which is liable to open them wide, and this will cause a counter-and-converging force in the legs because of the nature of resilience thereof. This stressing condition in the holder device (and the resultant deformation of the device although hardly discernible to the eyes) is, in fact, effective to assure the positive fixing of the holder device to the board.

As seen from the above, the holder device according to this invention is easy to fix to a board, and it is easy to handle, still assuring the positive and reliable gripping of an elongated object in it. The elongated body is held under the resilient force of the converging branches.

Because of this and because the holder device is of a plastic mould which is soft in nature, the object such as a wire can be held without injuring the surface appearance of the object body.

Figure 4:
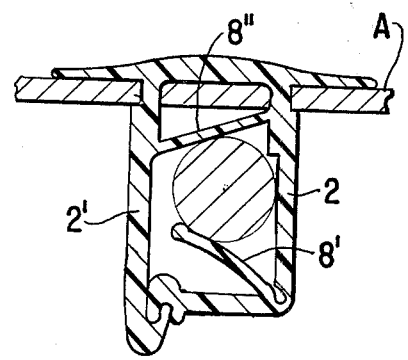
FIG. 4 shows in section a second embodiment of the holder device.

The particular embodiment given above and in the drawings has a pair of branches 8 and 8' both made in the form of cantilever. This embodiment, however, may be modified as seen in FIG. 4 by integrally connecting the free end of the upper branch 8'' to the opposite leg 2' in the form of bridge across the interleg space.

What is claimed is:

1. A plastic device for holding a length of wire and other elongated objects comprising: an umbrella-shaped head portion; a pair of plate legs integrally connected to and extending from the undersurface of the head portion; and a flap hinged to the end of one of the opposite legs by a hinge portion, said flap having a nail catch at the free end thereof, whereas the other leg having a hook at the free end thereof, thus connecting the opposite legs at their free ends by raising and fitting the flap into a closing position in the inter-leg space and by engaging the nail catch with the hook; said one leg having a slant branch extending downward from the vicinity of the connection of said one leg to said head portion whereas said flap having a similar slant branch in the vicinity of the hinge portion so that the slant branch when the flap is brought to the closing position, may provide with the slant branch of said one leg, a converging space in which the elongated object is fixedly confined.

2. A plastic holder device according to claim 1 wherein said slant branch of said one leg is integrally connected at its opposite end to said other leg in the form of bridge across the interleg space.

3. A plastic holder device according to claim 1 wherein each of said legs has a recess in the vicinity of the connection of the leg to said head portion, the recess being adapted to receive and catch, the circumference thickness of an aperture which is made in a board.

* * * * *